(12) United States Patent
Mashima et al.

(10) Patent No.: US 9,032,213 B2
(45) Date of Patent: May 12, 2015

(54) DATA DISTRIBUTION PATH VERIFICATION

(71) Applicant: Fujitsu Limited, Kawasaki-shi, Kanagawa (JP)

(72) Inventors: Daisuke Mashima, Sunnyvale, CA (US); Ulrich Herberg, Sunnyvale, CA (US); Wei-Peng Chen, Fremont, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/951,253

(22) Filed: Jul. 25, 2013

(65) Prior Publication Data

US 2015/0033024 A1    Jan. 29, 2015

(51) Int. Cl.
*H04L 29/00*    (2006.01)
*H04L 9/32*    (2006.01)

(52) U.S. Cl.
CPC .................... *H04L 9/3281* (2013.01)

(58) Field of Classification Search
CPC .............. H04L 9/00; H04L 9/32; G06F 21/00
USPC ......................................................... 713/176
See application file for complete search history.

(56) References Cited

U.S. PATENT DOCUMENTS 6,915,433 B1 *   7/2005   Barber ........................... 713/176
7,546,455 B2 *   6/2009   Kakii ............................. 713/156

OTHER PUBLICATIONS

Daisuke, Mashima, "Safeguarding Health Data with Enhanced Accountability and Patient Awareness" Georgia Institute of Technology, Dec. 2012, 162 pgs.
Rocio Aldeco-Perez et al., "Provenance-based Auditing of Private Data Use", School of Electronics and Computer Science, University of Southampton, International Academic Research Conference, Visions of Computer Science, 2008, 12 pgs.
Mashima et al. "Enabling Robust Information Accountability in E-healthcare Systems." In Proc. of USENIX HealthSec Dec. 2012.
Mashima et al. "Enhancing Accountability of Electronic Health Record Usage via Patient-centric Monitoring." In Proc. of ACM IHI Jan. 2012.
The Laws of Identity. http://www.identityblog.com/stories/2004/12/09/thelaws.html, May 11, 2005.

(Continued)

*Primary Examiner* — Brandon Hoffman
*Assistant Examiner* — Michael D Anderson
(74) *Attorney, Agent, or Firm* — Maschoff Brennan

(57) ABSTRACT

A method may include receiving data and first path-metadata. The first path-metadata may include a first entity identifier. The first entity identifier may be associated with a first receiving entity that receives the data and the first path-metadata from an originating entity. The first path-metadata may also include a first digital signature associated with the originating entity. The method may further include receiving second path-metadata that may include the first path-metadata and a second entity identifier associated with a second receiving entity. The second path-metadata may also include a second digital signature associated with the first receiving entity. The method may additionally include verifying that the data was communicated by the originating entity to the first receiving entity and from the first receiving entity to the second receiving entity based on the first path-metadata, the second path-metadata, the first digital signature, and the second digital signature.

20 Claims, 10 Drawing Sheets

(56) References Cited

OTHER PUBLICATIONS

D. Bauer, D. M. Blough, and D. Cash, "Minimal Information Disclosure with Efficiently Verifiable Credentials". In Digital Identity Management, Oct. 31, 2008.

D. Bergman, D. Jin, J. Juen, N. Tanaka, C. Gunter, and A. Wright, "Non-Intrusive Load Shed Verification" Pervasive Computing, IEEE (vol. 10, Issue: 1) Jan.-Mar. 2011, pp. 49-57.

G. Hart. "Nonintrusive appliance load monitoring" Proceedings of the IEEE (vol. 80, Issue: 12, Dec. 1992.

D. Mashima and M. Ahamad. Enabling Robust Information Accountability in E- healthcare Systems. In 3rd USENIX Workshop on Health Security and Privacy, Aug. 2012.

R. C. Merkle. Protocols for public key cryptosystems. In IEEE Symposium on Security and Privacy, 1980.

R. C. Merkle. "A certified digital signature". CRYPTO, pp. 218-238, 1998.

A. Mohan, D. Bauer, D. M. Blough, M. Ahamad, B. Bamba, R. Krishnan, L. Liu, D. Mashima, and B. Palanisamy. "A Patient-centric, Attribute-based, Source-verifiable Framework for Health Record Sharing" 2009.

P. Mohan, A. Thakurta, E. Shi, D. Song, and D. E. Culler. "Gupt: privacy preserving data analysis made easy". In SIGMOD Conference, May 2012.

E. Shi, T.-H. H. Chan, E. G. Rie_el, R. Chow, and D. Song. Privacy-Preserving Aggregation of Time-Series Data, Aug. 2011.

Izu, Tetsuya, et al. "PIATS: A partially Sanitizable Signature Scheme." Information and Communications Security. Springer Berlin Heidelberg, 2005. 72-83.

Daisuke Mashima & Mustaque Ahamad, Enabling Robust Information Accountability in E-healthcare Systems, In Proc. of the 3rd USENIX Workshop on Health Security and Privacy (HealthSec 2012), Bellevue, WA, 2012.

\* cited by examiner

DATA DISTRIBUTION PATH VERIFICATION

FIELD

The embodiments discussed herein are related to data distribution path verification.

BACKGROUND

Multi-hop data communications generally involve communication of data from an originating domain to one or more intermediaries, and to a receiving domain. Multi-hop data communication may be performed in distributed environments in which multiple tiers of intermediaries and receiving domains receive the data from a single upstream domain. The domains upstream and downstream of one another as well as the domains in a tier may be unrelated and not commonly controlled. Accordingly, domains upstream and downstream of one another may each be subject to insecurities. Additionally, portions of the data may be unsuitable or inapplicable to different domains in a tier.

To accept the data, the receiving domain implicitly trusts the originating domain and each of the intermediaries. However, trusting the intermediaries is often not pragmatic due to the insecurities that may be introduced by each of the intermediaries or at each of the intermediaries such as malware and/or unauthorized data manipulation. Additionally, the receiving domain may not be able to identify the intermediaries, essentially absolving the intermediaries of responsibility.

The subject matter claimed herein is not limited to embodiments that solve any disadvantages or that operate only in environments such as those described above. Rather, this background is only provided to illustrate one example technology area where some embodiments described herein may be practiced.

SUMMARY

A method may include receiving data and first path-metadata. The first path-metadata may include a first entity identifier. The first entity identifier may be associated with a first receiving entity that receives the data and the first path-metadata from an originating entity. The first path-metadata may also include a first digital signature associated with the originating entity. The method may further include receiving second path-metadata. The second path-metadata may include the first path-metadata and a second entity identifier associated with a second receiving entity that receives the data and the second path-metadata from the first receiving entity. The second path-metadata may also include a second digital signature associated with the first receiving entity. The method may additionally include verifying that the data was communicated by the originating entity to the first receiving entity and from the first receiving entity to the second receiving entity based on the first path-metadata, the second path-metadata, the first digital signature, and the second digital signature.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

Some embodiments described herein enable verification and identification of each entity involved in a multi-hop communication of data. Additionally, whether each of the entities was an intended recipient of an upstream entity may be verified before data is accepted. Therefore, the last entity to receive the data in the multi-hop communication may verify the entire path taken by the data to help verify that the integrity of the received data has not been compromised. Embodiments of the present disclosure will be explained with reference to the accompanying drawings.

Figure 1:
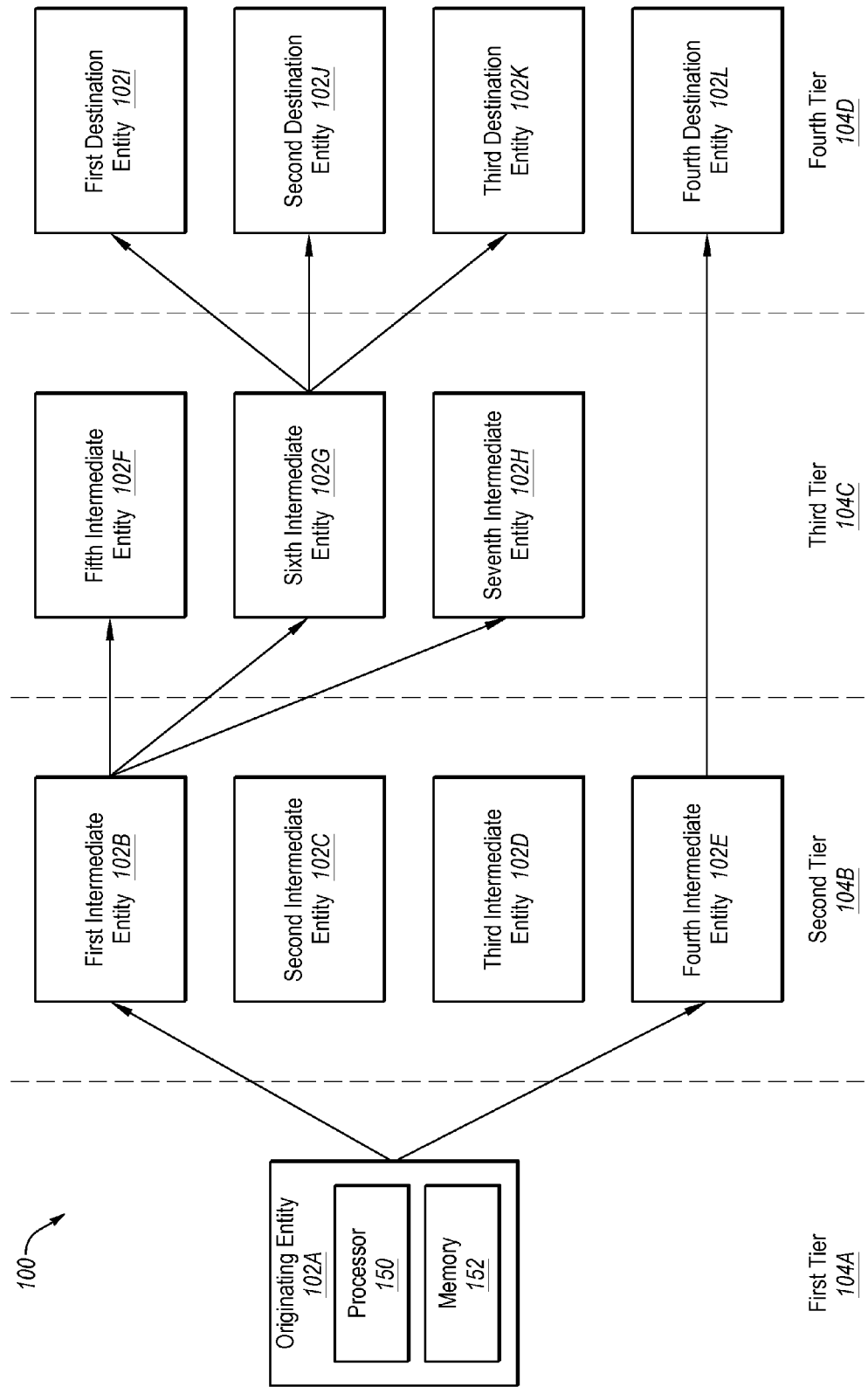
FIG. 1 illustrates an example distributed multi-domain environment (environment) in which some embodiments disclosed herein may be implemented.

FIG. 1 illustrates an example distributed multi-domain environment (environment) 100, in accordance with at least one embodiment described herein. The environment 100 includes multiple entities 102A-102L (generally, entity or entities 102) that may perform multi-hop communication of data. Generally, the environment 100 is depicted such that data is communicated from an originating entity 102A through one or more intermediate entities 102B-102H, and to destination entities 102I-102L. However, in the environment 100 multiple variations of multi-hop communications are represented.

The environment 100 may be separated into one or more tiers 104A-104D (generally tier or tiers 104). The tiers 104 may reflect a general organization of the entities 102 in the environment 100. To conventionalize the organization, a first tier 104A and entities 102 included therein are referred to as upstream of a second tier 104B and the entities 102 included therein. Likewise, the second tier 104A and entities 102 included therein are referred to as downstream of the first tier 104A and entities 102 included therein and upstream of a third tier 104C and entities 102 included therein, etc. During multi-hop communications, data is generally communicated from upstream entities 102 to downstream entities 102.

The first tier 104A may include the originating entity 102A in which the data may be generated or otherwise created. The originating entity 102A may communicate the data to one or more intermediate entities 102B-102H. The second tier 104B and the third tier 104C may include the intermediate entities 102B-102H. The intermediate entities 102B-102H may receive data from one or more respective upstream entities 102 and may communicate the data or some derivative thereof to respective downstream entities 102. A fourth tier 104D may include the destination entities 102I-102L. The destination entities 102I-102L may receive data communicated from upstream entities 102, but may not communicate the data to downstream entities.

Which tier 104 in which an entity 102 is included may be based on the function or role of the entity 102 in the environment 100, contractual relationships, geographic location, etc. Additionally, which tier 104 in which an entity 102 is included may differ based on a network or a system in which the environment 100 is implemented. For example, the environment 100 may be implemented in a utilities communication network. In this and other implementations, the originating entity 102A may include a utility company. The intermediate entities 102B-102H may be service providers and/or demand response (DR) aggregators. The destination entities 102I-102L may be utilities customers. The data may be a DR request or information pertaining to customer usage. Additionally or alternatively, the environment 100 may be implemented by an E-healthcare system, an enterprise with one or more divisions and/or employees, mobile to mobile communications networks, etc.

As illustrated by these example implementations, the originating entity 102A, the intermediate entities 102B-102H and the destination entities 102I-102L may include computing systems of an organization, computing systems of an individual, nodes in a communication network, etc. Additionally, the environment 100 may be implemented by any suitable mechanism, such as a program, software, function, library, software-as-a-service, analog or digital circuitry, or any combination thereof.

The entities 102 may differ within an implementation of the environment 100. For instance, the first destination entity 102I may include a mobile device of an individual, while the originating entity 102A may include a server of a utilities company. The entities 102 may process the data or may simply relay the data without modification or processing. For example, the entities 102 may also include a processor 150, which may be coupled to memory 152 (depicted in an originating entity 102A only). In some embodiments, the environment 100 or some portion or function thereof may be embodied in logic or instructions resident in the memory 152 for execution by the processor 150. The processor 150 may include, for example, a microprocessor, microcontroller, digital signal processor (DSP), application specific integrated circuit (ASIC), a Field Programmable Gate Array (FPGA), or any other digital or analog circuitry configured to interpret and/or to execute program instructions and/or to process data. In some embodiments, the processor 150 may interpret and/or execute program instructions and/or process data stored in the memory 152.

The memory 152 may include any suitable computer-readable media configured to retain program instructions and/or data for a period of time. By way of example, and not limitation, such computer-readable media may include tangible computer-readable storage media including Random Access Memory (RAM), Read-Only Memory (ROM), Electrically Erasable Programmable Read-Only Memory (EEPROM), Compact Disk Read-Only Memory (CD-ROM), or other optical disk storage, magnetic disk storage or other magnetic storage devices, flash memory devices (e.g., solid state memory devices), a specific molecular sequence (e.g., DNA or RNA) or any other storage medium which may be used to carry or store desired program code in the form of computer-executable instructions or data structures and which may be accessed by the processor 150. Combinations of the above may also be included within the scope of computer-readable media. Computer-executable instructions may include, for example, instructions and data that cause a general purpose computer, special purpose computer, or special purpose processing device (e.g., the processor 150) to perform a certain function or group of functions.

A multi-hop data communication includes a set of entities 102. The entities 102 through which the data is communicated is referred to herein as a data path. As stated above, the general organization of the environment 100 is that data is communicated from the originating entity 102A to intermediate entities 102B-102H, and to destination entities 102I-102L. However, this is not limiting. Multi-hop data communications may include data paths that include various entities 102 from various tiers 104, may skip tiers 104, may end at an intermediate entity 102B-102H, etc. For example, as depicted in FIG. 1, the originating entity 102A may communicate data to a first intermediate entity 102B and a fourth intermediate entity 102E. The first intermediate entity 102B may communicate the data or some derivative thereof to the fifth intermediate entity 102F, the sixth intermediate entity 102G, and the seventh intermediate entity 102H. The sixth intermediate entity 102G may then communicate the data or some derivative thereof to a first destination entity 102I, a second destination entity 102J, and a third destination entity 102K. In contrast, in some embodiments, the fifth intermediate entity 102F and the seventh intermediate entity 102H may not communicate the data. The fourth intermediate entity 102E may communicate the data or some derivative thereof to the fourth destination entity 102L.

Figure 2:
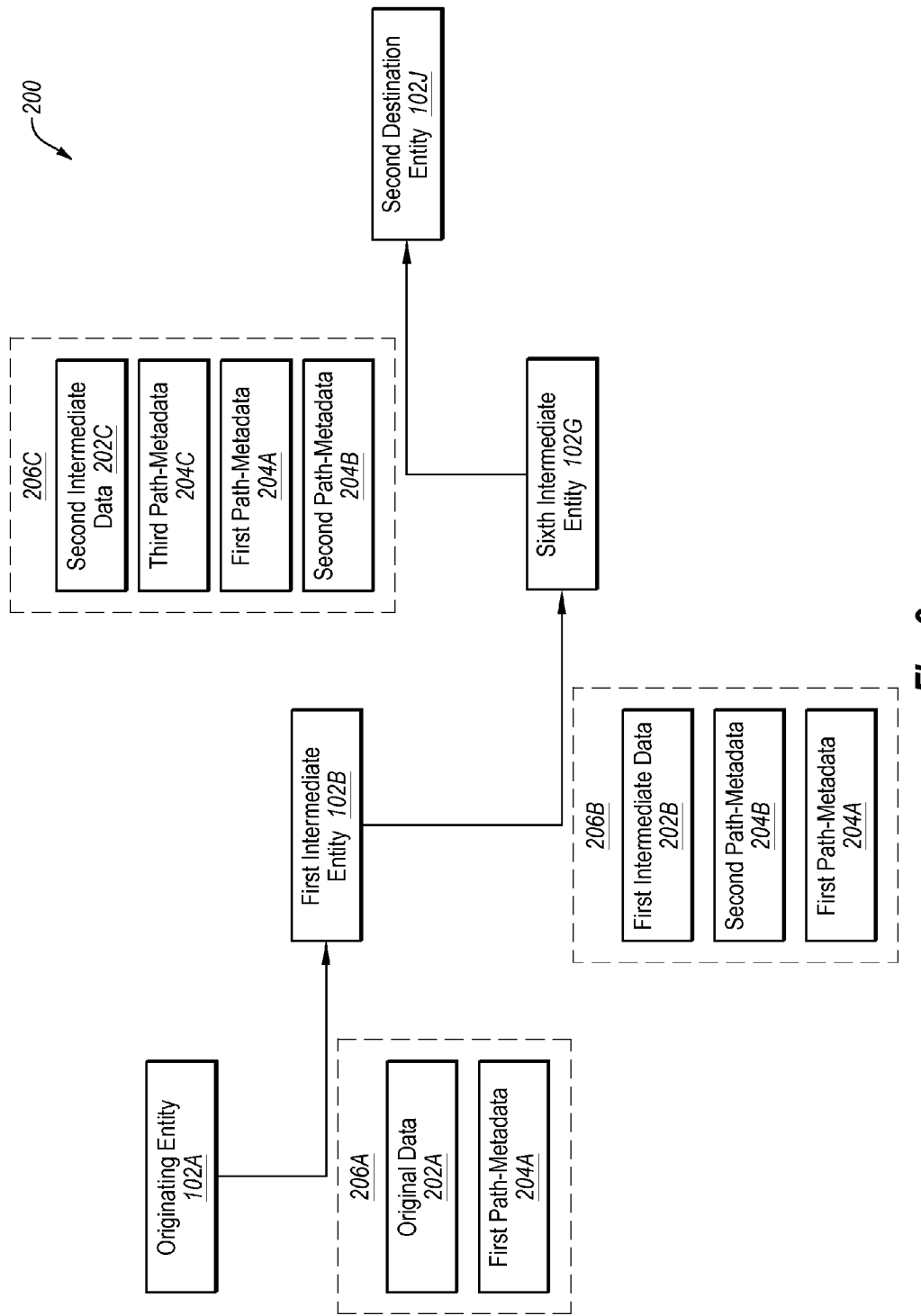
FIG. 2 illustrates an example data path that may be implemented in the environment of FIG. 1.

In the environment 100, data paths, identities of entities 102 included in the data paths, and the data communicated in the data paths may be verified using path-metadata. The path-metadata may be embedded with the data by one or more of the entities 102 included in a particular data path. For example, FIG. 2 illustrates an example data path 200 that may be implemented in the environment 100 of FIG. 1, in accordance with at least one embodiment described herein. The data path 200 includes the originating entity 102A, the first intermediate entity 102B, the sixth intermediate entity 102G, and the second destination entity 102J of FIG. 1. The "upstream" and "downstream" conventions described with reference to FIG. 1 are similar in FIG. 2. Specifically, the originating entity 102A is upstream of the first intermediate entity 102B and the sixth intermediate entity 102G is downstream of the first intermediate entity 102B, etc. Between each of the entities 102 are data packets 206A-206C that include data (202A, 202B, and 202C described below) and metadata (204A, 204B, and 204C described below) communicated between the entities 102.

In the data path 200, the originating entity 102A may prepare the original data 202A, which may be distributed downstream. Additionally, the originating entity 102A may calculate data-specific metadata based on the original data 202A. In some embodiments, the data-specific metadata may include a hash value of the original data 202A or a root hash value of a redactable signature scheme. The redactable signature scheme may include, but is not limited to a signature scheme including Chameleon hash, a partially sanitizable signature scheme (e.g., PIATS), SUMI, or a Merkle hash tree. Some additional details of the Merkle hash tree are described elsewhere herein. Some additional details of an example signature scheme including Chameleon hash may be found in Ateniese, Giuseppe, et al. "Sanitizable Signatures." Computer Security-ESORICS 2005. Springer Berlin Heidelberg, 2005, p. 159-177, which is incorporated herein by reference in its entirety. Some additional details of SUMI may be found in K. Miyazaki, S. Susaki, M. Iwamura, T. Matsumoto, R. Sasaki, H. Yoshiura, "Digital Documents Sanitizing Problem", The Institute of Electronics, Information and Communication Engineers (IEICE) technical report, ISEC 2003-20, May 2003, which is incorporated herein by reference in its entirety. Some additional details of PIATS may be found in Izu, Tetsuya, et al. "PIATS: A partially Sanitizable Signature Scheme." Information and Communications Security. Springer Berlin Heidelberg, 2005. 72-83, which is incorporated herein by reference in its entirety.

The original data 202A may be communicated from the originating entity 102A to the first intermediate entity 102B via the data packet 206A. Before communicating the data packet 206A, the originating entity 102A may embed in the data packet 206A a portion of a first path-metadata 204A. In some embodiments, the first path-metadata 204A may be represented by a first path-metadata expression:

$$P_1 = [M, EI_{FIE}]_{SIG_{OE}}$$

In the first path-metadata expression, M may represent the data-specific metadata. The data-specific metadata may be uniquely tied to the original data 202A in some embodiments. $EI_{FIE}$ may represent an entity identifier (EI) of the first intermediate entity 102B (FIE), $SIG_{OE}$ may represent a digital signature (SIG) of the originating entity 102A (OE), and $P_1$ may represent the first path-metadata and may be a signature of the originating entity 102A on the pair of M and $EI_{FIE}$. In some embodiments, the digital signature of the originating entity 102A may be based on a private key of the originating entity 102A. Additionally or alternatively, in some embodiments the entity identifier may be a public key of the first intermediate entity 102B, a hash value associated with the first intermediate entity 102B, such as a fingerprint of a digital certificate that belongs to the first intermediate entity 102B, or any other suitable identifier that may be linked to the public key of the first intermediate entity 102B. Some additional details of the hash value are discussed below.

In some embodiment, the originating entity 102A may communicate the original data 202A and the first path-metadata ($EI_{FIE}$, and $P_1$, respectively) to the first intermediate entity 102B. In these and other embodiments, the data-specific metadata M may not be communicated because M may be calculated from any downstream entity receiving the original data 202A.

Thus, generally, the first path-metadata 204A includes the data-specific metadata, the entity identifier for the entity 102 to which the original data 202A is immediately communicated, and the digital signature of the entity 102 from which the originating data 202A was communicated. With reference to the originating entity 102A, the first path-metadata 204A may be referred to as downstream path-metadata because the first path-metadata 204A is communicated to a downstream entity with respect to the originating entity 102A.

The first intermediate entity 102B may receive the first data packet 206A from the originating entity 102A, which may include the original data 202A and the first path-metadata 204A, or some portion thereof. With reference to the first intermediate entity 102B, the first path-metadata 204A may be referred to as upstream path-metadata because the first path-metadata 204A is communicated from an upstream entity.

The first intermediate entity 102B may modify the original data 202A or simply communicate the original data 202A via a data packet 206B to a downstream entity 102 such as the sixth intermediate entity 102G. In some circumstances, the first intermediate entity 102B may modify the original data 202A. For example, the first intermediate entity 102B may modify the original data 202A to protect the privacy of one or more downstream entities 102 and/or one or more upstream entities 102. However, in modifications to the original data 202A performed by the first intermediate entity 102B may not affect the ability of any downstream entity to calculate the data-specific metadata M.

For example, with combined reference to FIGS. 1 and 2, the first intermediate entity 102B may be upstream of the sixth intermediate entity 102G and the seventh intermediate entity 102H. The original data 202A may include information that pertains to both the sixth intermediate entity 102G and the seventh intermediate entity 102H. However, the information may be sensitive, irrelevant, etc. such that the sixth intermediate entity 102G may not want the seventh intermediate entity 102H to have the information or vice versa. Accordingly, the first intermediate entity 102B may redact one or more data items included in the original data 202A, thereby creating first intermediate data 202B. The first intermediate data 202B may be communicated to the sixth intermediate entity 102G with the data items redacted. Alternatively, the first intermediate entity 102B may simply communicate the original data 202A in an un-modified form to the sixth intermediate entity 102G. In this circumstance, the first intermediate data 202B may be substantially equivalent to the original data 202A.

Referring back to FIG. 2, the first intermediate entity 102B may additionally embed the first path-metadata 204A as well as second path-metadata 204B in the data packet 206B. In some embodiments, the second path-metadata 204B may be represented by a second path-metadata expression:

$$P_2 = [P_1, EI_{SIE}]_{SIG_{FIE}}$$

In the second path-metadata expression, $P_2$ may represent the second path-metadata 204B and may be a signature of the first intermediate entity 102B on a pair of $P_1$ and $EI_{SIE}$, $P_1$ may represent the first path-metadata 204A (e.g., the signature of the originating entity 102A on the pair of M and $EI_{FIE}$ and [M, $EI_{FIE}]_{SIG_{OE}}$ described above) $EI_{SIE}$ may represent an entity identifier (EI) of the sixth intermediate entity 102G (SIE), and $SIG_{FIE}$ may represent the digital signature (SIG) of the first intermediate entity 102B (FIE). In some embodiments, the digital signature of the first intermediate entity 102B may be based on a private key of the first intermediate entity 102B. Additionally or alternatively, in some embodiments the entity identifier may be a public key of the sixth intermediate entity 102G, a hash value associated with the sixth intermediate entity 102G, or any other suitable identifier that may be linked to the public key of the sixth intermediate entity 102G.

In some embodiment, the first intermediate entity 102B may communicate the first intermediate data 202B (which may be substantially equivalent to the original data 202A), the first path-metadata 204A ($P_1$ and $EI_{FIE}$, respectively), the second path-metadata 204B ($P_2$ and $EI_{SIE}$, respectively) to the sixth intermediate entity 102G. In these and other embodiments, the data-specific metadata M may not be communicated because M may be calculated from any downstream entity.

As such, the second data packet 206B including the first intermediate data 202B, the first path-metadata 204A, and the second path-metadata 204B may be communicated to the sixth intermediate entity 102G. With reference to the first intermediate entity 102B, the second path-metadata 204B may be referred to as downstream path-metadata because the second path-metadata 204B is communicated to the sixth intermediate entity 102G which is a downstream entity with respect to the first intermediate entity 102B. Conversely, with reference to the sixth intermediate entity 102G, the second path-metadata 204B may be referred to as upstream path-metadata because the first intermediate entity 102B is an upstream entity with reference to the sixth intermediate entity 102G.

Thus, prior to communicating the first intermediate data 202B to the sixth intermediate entity 102G, the first intermediate entity 102B may identify the downstream entity (e.g., the sixth intermediate entity 102G) to which the first intermediate data 202B is to be communicated. The first intermediate entity 102B may also embed in downstream path-metadata the upstream path-metadata (e.g., the first path-metadata) and an entity identifier of the downstream entity. Additionally, the first intermediate entity 102B may sign the downstream path-metadata with a private key.

Like the first intermediate entity 102B, the sixth intermediate entity 102G may modify the first intermediate data 202B to create second modified data 202C. For example, the first intermediate data 202B may include the original data 202A with redacted data items and the second modified data 202C may include the original data 202A with additional redacted data items. Alternatively, the second intermediate data 202C may be substantially equivalent to the first intermediate data 202B and/or the original data 202A. Alternatively still, the first intermediate data 202B may be substantially equivalent to the original data 202A, but the second intermediate data 202C may include the first intermediate data 202B with redacted data items. However, in modifications to the original data 202A and/or the first intermediate data 202B performed by the sixth intermediate entity 102G may not affect the ability to calculate the data-specific metadata M.

The sixth intermediate entity 102G may additionally generate third path-metadata 204C. The third path-metadata 204C may be represented by a third path-metadata expression:

$$P_3 = [P_2, EI_{SDE}]_{SIG_{SIE}}$$

In the third path-metadata expression, $P_3$ may represent the third path-metadata and may be a signature of the sixth intermediate entity 102B on a pair of $P_2$ and $EI_{SDE}$, $P_2$ may represent the second path-metadata (i.e., $[P_1, EI_{SIE}]_{SIG_{FIE}}$ described above) $EI_{SDE}$ may represent an entity identifier (EI) of the second destination entity 102J (SDE), and SIG may represent the digital signature (SIG) of the sixth intermediate entity 102G (SIE). In some embodiments, the digital signature of the sixth intermediate entity 102G may be generated based on a private key of the sixth intermediate entity 106G. Additionally or alternatively, in some embodiments the entity identifier may be a public key of the second destination entity 102J, a hash value associated with the second destination entity 102J, such as a fingerprint of a digital certificate belonging to 102J, or any other suitable identifier that may be linked to the public key of the second destination entity 102J.

In some embodiment, the sixth intermediate entity 102G may communicate the second intermediate data 202C, which may be substantially equivalent to the original data 202A and/or the first intermediate data 202B, the first path-metadata 204A ($P_1$ and $EI_{FIE}$, respectively), the second path-metadata 204B ($P_2$ and $EI_{SIE}$, respectively), and the third path-metadata 204B ($P_3$ and $EI_{SDR}$, respectively) to the second destination entity 102J. In these and other embodiments, the data-specific metadata M may not be communicated because M may be calculated from any downstream entity.

A data packet 206C including the second intermediate data 202C, the first path-metadata 204A, the second path-metadata 204B, and the third path-metadata 204C may be communicated to the second destination entity 102J. With reference to the sixth intermediate entity 102G, the third path-metadata 204C may be referred to as downstream path-metadata because the third path-metadata 204C is communicated to the second destination entity 102J, which is a downstream entity with respect to the sixth intermediate entity 102G. Conversely, with reference to the second destination entity 102J, the third path-metadata 204C may be referred to as upstream path-metadata because the sixth intermediate entity 102G is an upstream entity with reference to the second destination entity 102J.

In sum, the second destination entity 102J receives the second intermediate data 202C with the first path meta-data 204A, the second path-metadata 204B, and the third path-metadata 204C. Accordingly, the second intermediated data 202C received at the second destination entity 102J may enable calculation of the data-specific metadata (e.g., "M" in the first path-metadata 204A). The upstream metadata may also include digital signatures for each of the upstream entities (e.g., the originating entity 102A, the first intermediate entity 102B, and the sixth intermediate entity 102G) to verify the identities of the upstream entities.

As mentioned above, from the upstream metadata, an entity 102 may verify a particular data path such as the data path 200. Specifically in FIG. 2, from the first path-metadata 204A, the second path-metadata 204B, and the third path-metadata 204C, the second destination entity 102J may verify the data path 200; from the first path-metadata 204A and the second path-metadata 204B, the sixth intermediate entity 102G may verify a portion of the data path 200; and from the first path-metadata 204A the first intermediate entity 102B may verify a portion of the data path 200.

Verification of the data path 200 may include calculating the data-specific metadata from the original data 202A, the first intermediate data 202B, or the second intermediate data 202C. The data-specific metadata may be calculated as a general cryptographic hash value of the original data 202A or a hash value calculated in redactable signature schemes, such as a root hash value of a Merkle hash tree constructed based on 202A, the first intermediate data 202B, or the second intermediate data 202C to allow flexible redaction by the intermediate entities 102B-102H.

Using the data-specific metadata, a downstream entity such as the first intermediate entity 102B, the sixth intermediate entity 102G, or the second destination entity 102J may verify that the original data 202A or derivations thereof such as the first intermediate data 202B or the second intermediate data 202C is created by the originating entity 102A. Additionally, verification of the data path 200 may include identifying each upstream entity 102 in a sequence through comparisons of the entity identifiers and the digital signatures included in the path metadata. Additionally, when the upstream entities 102 are identified, the verification may include determining whether the upstream entities 102 are trustworthy.

For example, the second destination entity 102J may verify the data path 200 as follows. The second destination entity 102J may know the public key of the originating entity 102A. As mentioned above, the originating entity 102A may be a trusted entity. Accordingly the second destination entity 102J may begin a verification process with the originating entity 102A and may subsequently verify each of the downstream entities (e.g., 102B and 102G) between the originating entity 102A and the second destination entity 102J in the order that the original data 202A or some derivative thereof was communicated. Verification may be performed iteratively to verify whether each recipient designated as part of each of the path metadata (e.g., 204A, 204B, and 204C) is a signer of the immediately downstream path metadata. For example, it may be verified that first intermediate entity 102B is specified by the originating entity 102A, and is the signer of first path-metadata 204A and so forth.

In some embodiments, the second destination entity 102J may receive the public key of the originating entity 102A from a trusted authentication authority (e.g., VeriSign) in the form of digital certificates such that the second destination entity 102J may trust that the public key is in fact associated with the originating entity 102A. The second destination entity 102J may use the public key associated with the originating entity 102A to verify the digital signature of the first path-metadata 204A and, thus, verify the first path-metadata 204A.

In these and other embodiments, the second destination entity 102J may calculate the data-specific metadata from the second intermediate data 202C. Using the public key of the originating entity 102A, the calculated path-specific metadata, and the entity identifier of the first intermediate entity 102B ($EI_{FIE}$), a hash value of the pair of the data-specific metadata and the entity identifier of the first intermediate entity 102B ($EI_{FIE}$) may be calculated. The hash value may be used to verify the first path-metadata 204A was generated by the originating entity 102A. The second destination entity 102J may then verify each of the entities using the entity identifiers and each of the signatures included in each of the path-metadata. Additionally, the second destination entity 102J may determine that the first path-metadata 204A and the original data 202A were received by the first intermediate entity 102B based on the entity identifier included in the first path-metadata 204A and digital signature in second path-metadata 204B.

In some embodiments, the entity identifier included in the first path-metadata 204A may be the public key of the first intermediate entity 102B such that the second destination entity 102J may verify the second path-metadata 204B using the public key of the first intermediate entity 102B included in the first path-metadata 204A. The entity identifier of the first intermediate entity 102B may be a digital certificate that may include the public key of the first intermediate entity 102B. In these or other embodiments, the second destination entity may already know the public key of the first intermediate entity 102B (e.g., through a prior reception of a digital certificate associated with the first intermediate entity 102B from a certification authority) and the entity identifier of the first intermediate entity 102B may identify the public key of the first intermediate entity 102B. The second destination entity 102J may accordingly use the entity identifier included in the first path-metadata 204A to obtain the public key of the first intermediate entity 102B.

The second destination entity 102J may use the public key associated with the first intermediate entity 102B to verify the digital signature of the second path-metadata 204B and, thus, verify the second path-metadata 204B. Additionally, the second destination entity 102J may derive that the second path-metadata 204B and the first intermediate data 202B were received by the sixth intermediate entity 102G based on the entity identifier included in the second path-metadata 204B and a digital signature included in third path-metadata 204C. The entity identifier included in the second path-metadata 204B may be used by the second destination entity 102J to identify the public key of the sixth intermediate entity 102G in a manner similar to that described above with respect to identifying the public key of the first intermediate entity 102B from the entity identifier of the first intermediate entity 102B.

The second destination entity 102J may use the public key associated with the sixth intermediate entity 102G to verify the digital signature of the third path-metadata 204C and, thus, verify the third path-metadata 204C. Additionally, the second destination entity 102J may derive that the third path-metadata 204C and the second intermediate data 202C were intended for reception by the second destination entity 102J from the sixth intermediate entity 102G based on the entity identifier included in the third path-metadata 204C. Accordingly, the second destination entity 102J may verify each entity involved in communicating the second intermediate data 202C from the originating entity 102A to the second intermediate entity 102J via the data path 200.

Figure 3A:
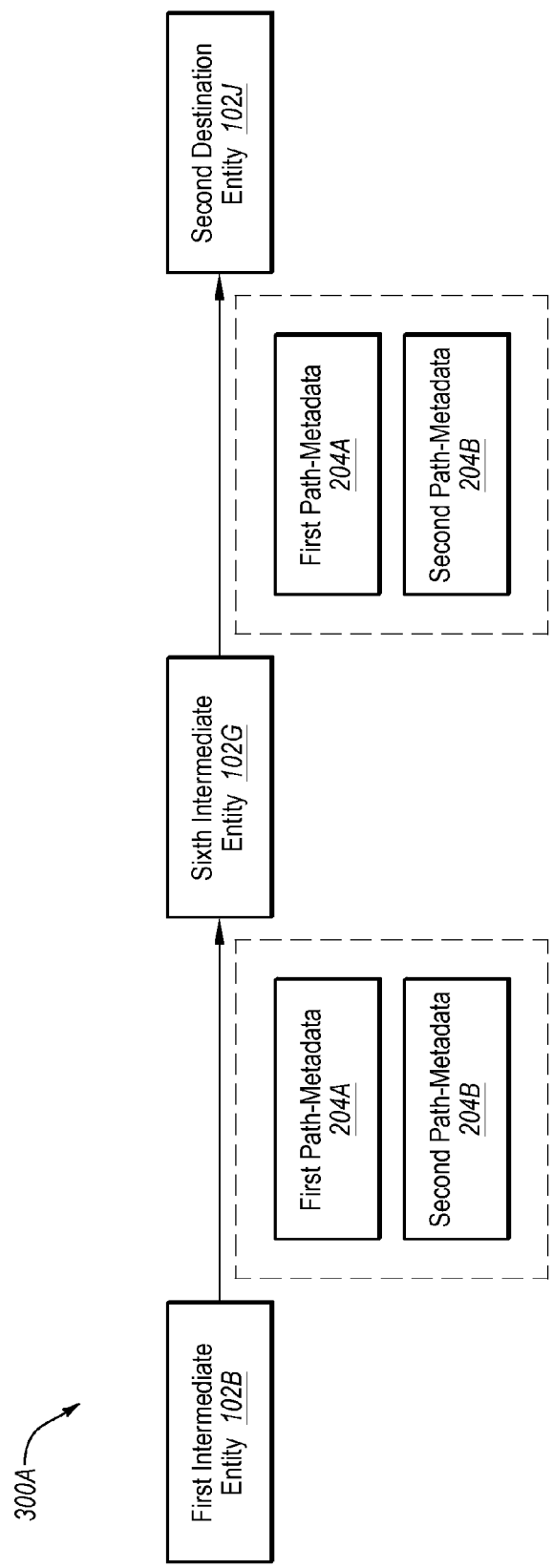
FIGS. 3A-3C illustrate example data paths with example path-metadata that may indicate that the data paths are problematic, which may occur in the environment of FIG. 1.
Figure 3B:
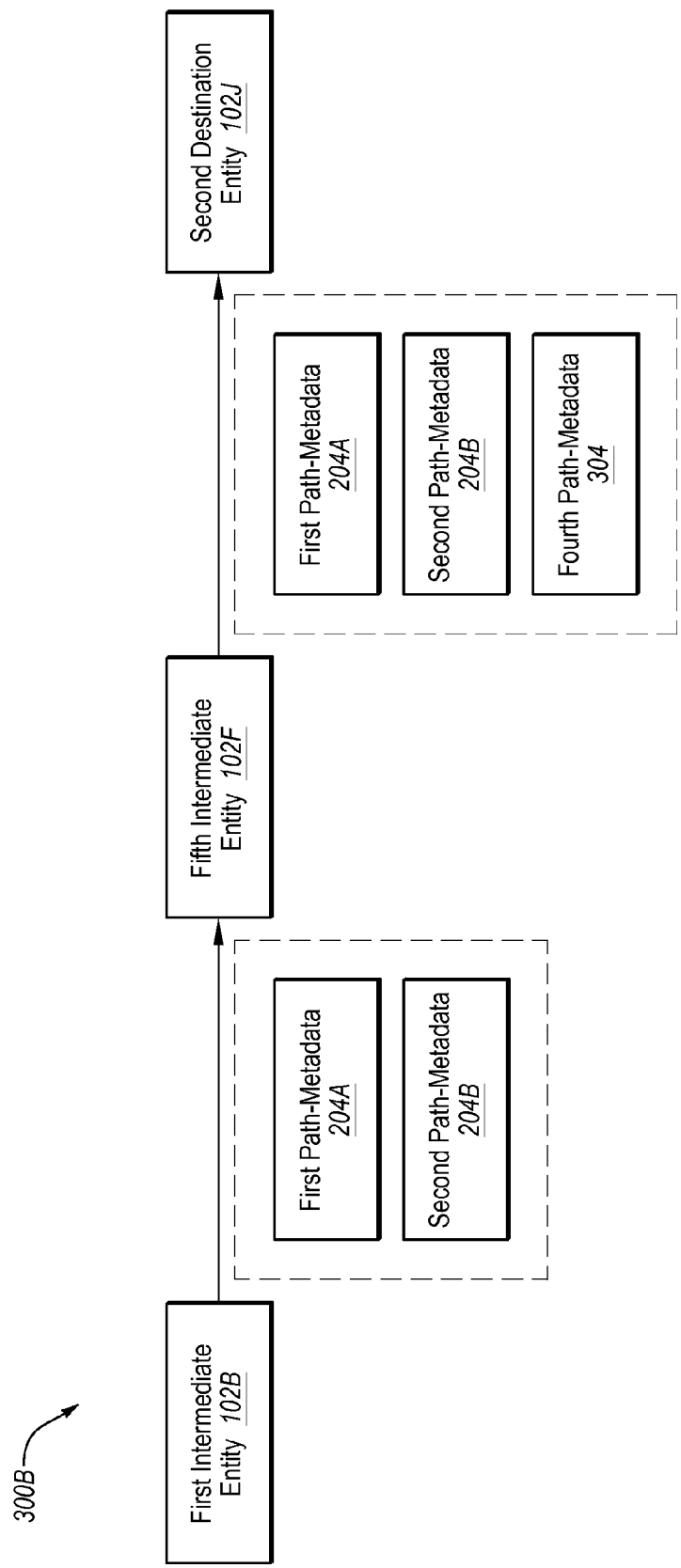
Figure 3C:
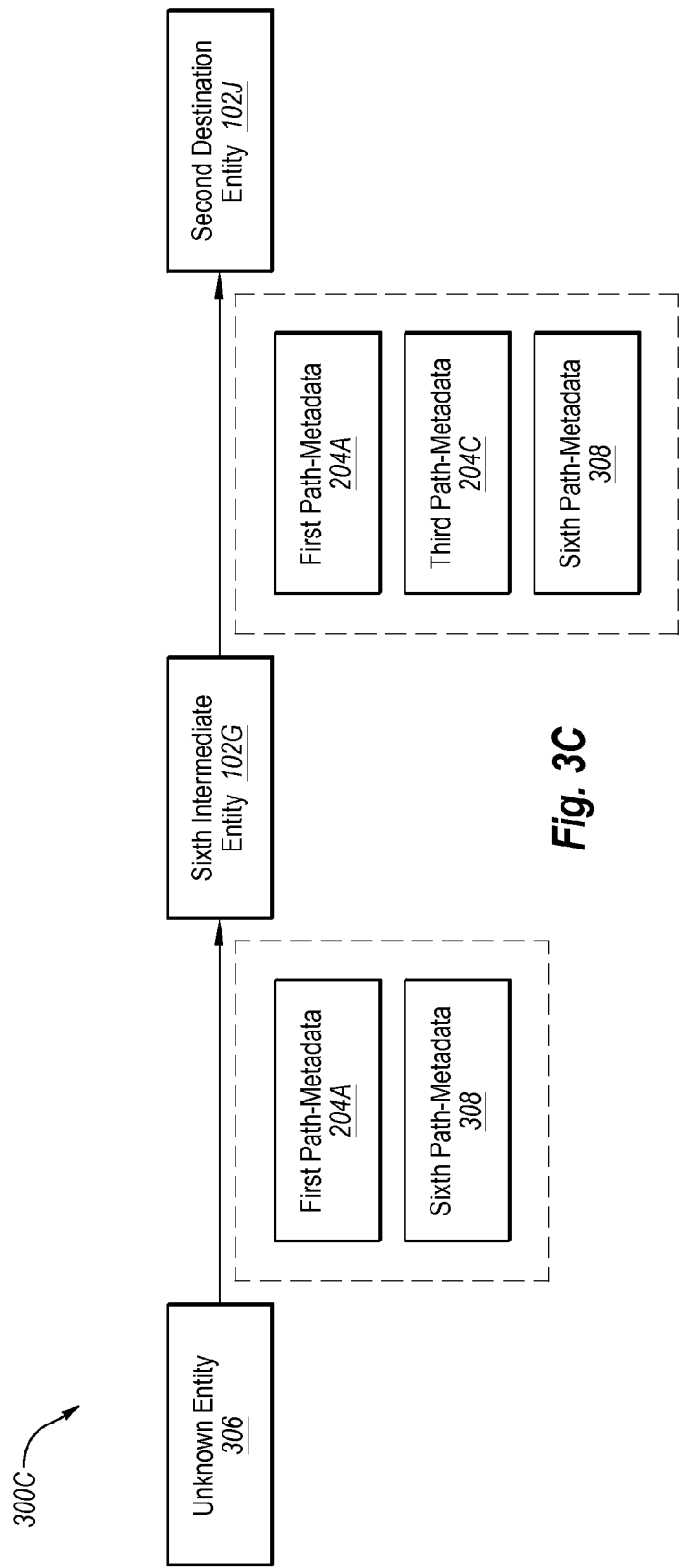

FIGS. 3A-3C illustrate examples of data paths 300A-300C, respectively, with example path-metadata that may indicate that the data paths 300A-300C are problematic, in accordance with at least one embodiment described herein. For example, the data paths 300A-300C may result in rejection of data or may indicate data is being communicated from an untrustworthy, malicious, or unintended entity. The data paths 300A-300C include problematic variations of the communication depicted in FIG. 2 from the first intermediate entity 102B to the sixth intermediate entity 102G and then to the second destination entity 102J. Accordingly, the first intermediate entity 102B, the sixth intermediate entity 102G, the fifth intermediate entity 102F, and the second destination entity 102J included in FIGS. 3A-3C were previously described with reference to FIGS. 1 and 2. Additionally, a third data path 300C includes an unknown entity 306, which may include one or more characteristics and/or functionalities of the entities 102 described with reference to FIGS. 1 and 2. In each of the data paths 300A-300C, between the entities 102, the path-metadata is included in dashed boxes.

FIG. 3A includes a first data path 300A in which the sixth intermediate entity 102G does not generate the third path-metadata 204C and instead just forwards the first path-metadata 204A and the second path-metadata 204B. The failure of the sixth intermediate entity 102G to include the third path-metadata 204C may be detected because the entity identifiers in the first path-metadata 204A and the second path-metadata 204B may fail to reference the second destination entity 102J. Additionally, the digital signatures in the first path-metadata 204A and the second path-metadata 204B do not match the upstream entity (i.e., the sixth intermediate entity 102G) that communicated the first path-metadata 204A and the second path-metadata 204B to the second destination entity 102J.

FIG. 3B illustrates an example in which the fifth intermediate entity 102F may be an eavesdropper that may receive the first path-metadata 204A and the second path-metadata 204B instead of the sixth intermediate entity 102G, as intended. As such, FIG. 3B includes a second data path 300B that includes the fifth intermediate entity 102F rather than the sixth intermediate entity 102G (as in FIGS. 3A and 3C). The fifth intermediate entity 102F may produce fourth path-metadata 304 with a format described above. The fifth intermediate entity 102F may communicate the first path-metadata 204A, the second path-metadata 204B and the fourth path-metadata 304 to the second destination entity 102J. However, the entity identifier in the second path-metadata 204B may not match the digital signature in the fourth path-metadata 304. Thus, the eavesdropping fifth intermediate entity 102F may be detected as such.

FIG. 3C illustrates the third data path 300C that includes the unknown entity 306. The unknown entity 306 may forward the first path-metadata 204A and may generate and sign sixth path-metadata 308 in a manner as described above. However the second destination entity 102J may not recognize and/or trust the unknown entity 306 such that the sixth path-metadata 308 may not be properly verified. In each of the data paths 300A-300C, the data (not expressly illustrated in FIGS. 3A-3B) received by the second destination entity 102J may be rejected.

Figure 4A:
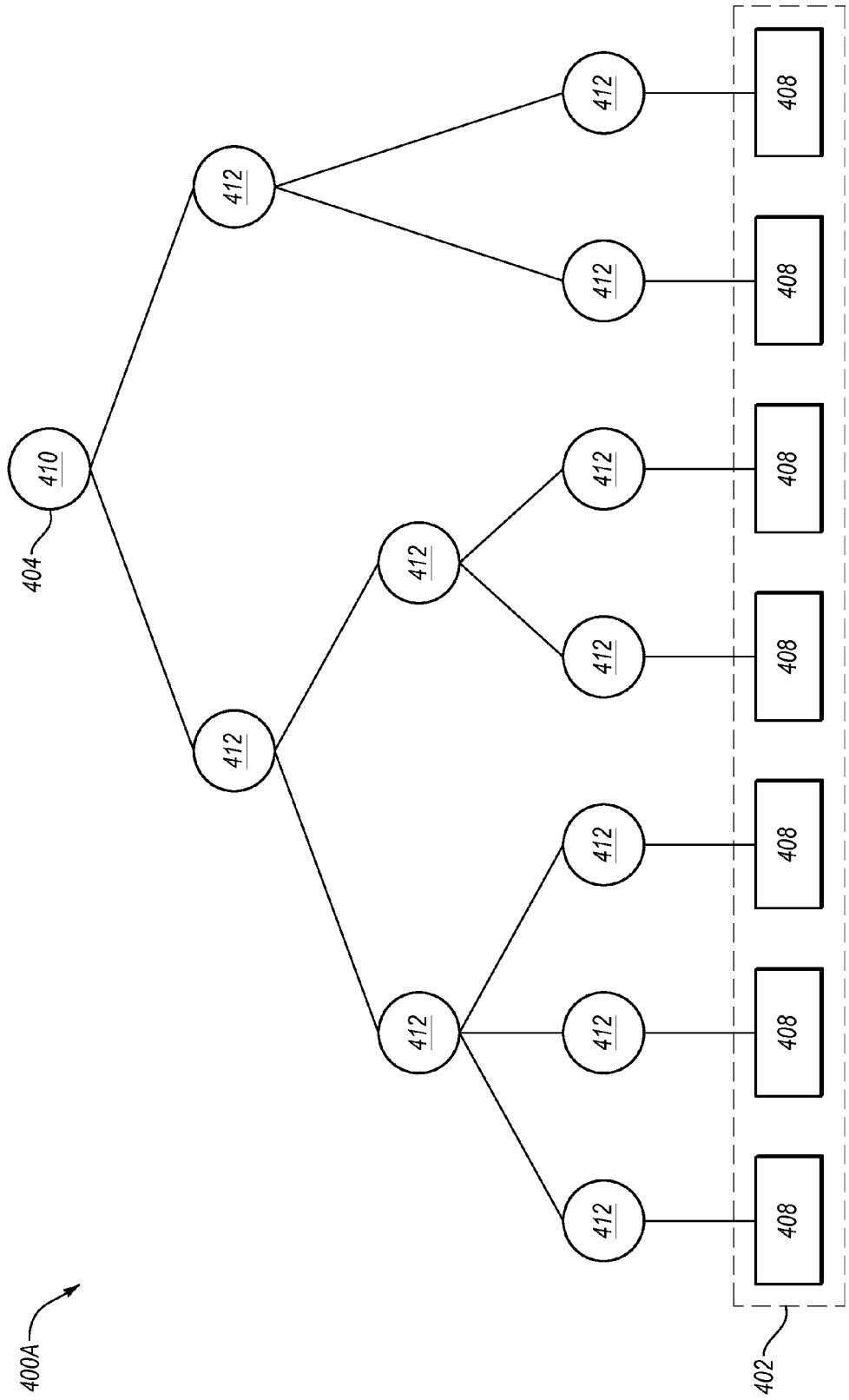
FIGS. 4A and 4B illustrate example Merkle hash trees in which data may be structured in the environment of FIG. 1.
Figure 4B:
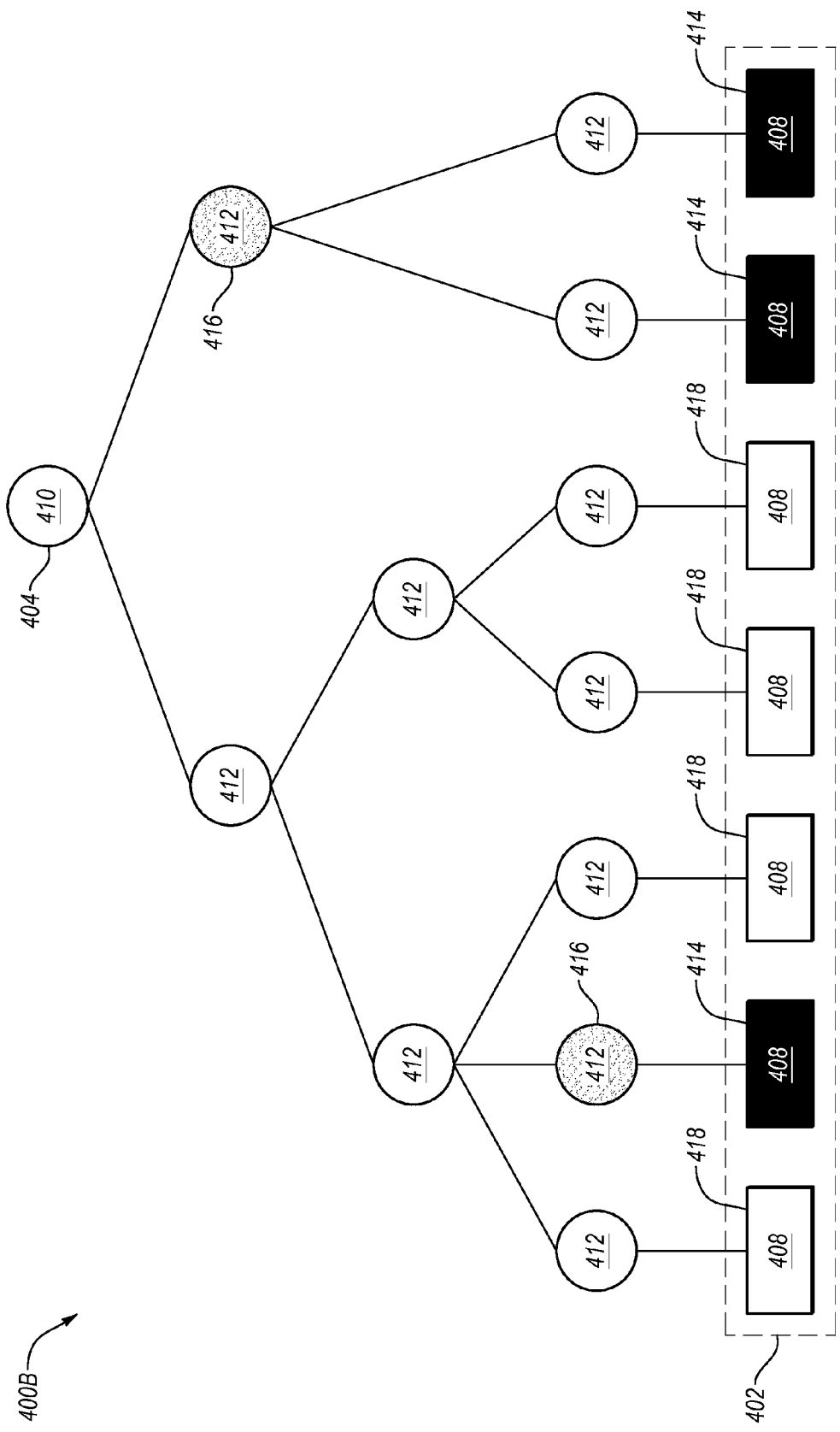

In addition to verifying the data paths as described above, in some embodiments, the entities (e.g., the entities 102 of FIG. 1) may verify data paths according to the present disclosure even when data items have been redacted. For example, FIGS. 4A and 4B illustrate example Merkle hash trees 400A and 400B in which data 402 may be structured in the environment 100 of FIG. 1, in accordance with at least one embodiment described herein. Specifically, in some embodiments the data 402, the data-specific metadata 404, and path-metadata may be structured according to the Merkle hash trees 400A and 400B. While some embodiments in which the Merkle hash trees 400A and 400B are utilized are described in detail, inclusion of the Merkle hash trees 400A and 400B is not meant to be limiting. It will be appreciated with the benefit of this disclosure that one or more other redactable signature schemes may be implemented in one or more embodiments described herein. For example, the redactable signature schemes may include a signature scheme using Chameleon hash, SUMI, or PIATS as well as any other suitable redactable/sanitizable signature scheme.

A first Merkle hash tree 400A may represent a structure that includes original data such as the original data 202A. A second Merkle hash tree 400B may represent intermediate data such as the first or second intermediate data 202B or 202C of FIG. 2 in which one or more data items have been redacted.

The general structure of the Merkle hash trees 400A and 400B may include leaf nodes 408, a root node 410, and one or more intermediate nodes 412. The leaf nodes 408 may represent data items included in the data 402. The root node 410 may be data-specific metadata discussed above, which, along with an entity identifier may be signed by an originating entity. The data-specific metadata is represented in FIGS. 4A and 4B by 404. The intermediate nodes 412 may represent hash values of immediate children intermediate nodes 412 or immediate children leaf nodes 408.

The first Merkle hash tree 400A in FIG. 4A may represent the data 402 in which no data items (represented by leaf nodes 408) have been redacted. In comparison to FIG. 4B, the second Merkle hash tree 400B may represent the data 402 in which some data items 408 have been redacted. In FIG. 4B, the redacted data items 408 are represented by blackened blocks 414 and the unredacted data items 408 are represented by white boxes 418. Based on the hashing scheme used by Merkle hash trees, the unredacted data items 108 included in the white boxes 418 may be verified by an entity without the entity knowing the redacted data items 108 Specifically, the root node 410 and the intermediate nodes 412 may not be modified. Thus, authentication may be possible by verifying the data specific metadata 404 of the root node 410 and reconstructing the second Merkle hash tree 400B using the hash values in the root node 410 and/or intermediate nodes 416 above redacted data items 414. The redacted data items 414 may not need to be known because the intermediate nodes 416 may be provided by a redacting intermediate entity and used by a verifying entity to sufficiently reconstruct and authenticate the second Merkle hash tree 400B. In some embodiments, a secure hash function may be used to reconstruct the second Merkle hash tree 400B using the hash values of the root nodes 410 and the intermediate nodes 416. That is, in these and other embodiments, the root hash value 410 itself may be the data-specific metadata. Thus, integrity of the data items 408, which were not redacted, can be verified by calculating the root node 410 and then verifying the root node 410 against the original entity's digital signature, by using the public key of the originating entity. Also, the verifying entity may not have to know all the intermediate nodes 412. Instead, the verifying entity may know the data items 408, which were not redacted, and hash values corresponding to the redacted data items 414 from the intermediate nodes 416 above the redacted data items 414.

Accordingly, some data items 408 of the data 402 may be withheld from particular entities without compromising the ability of the particular entities to trust and authenticate the data items 408 that may be received by the particular entities.

Figure 5:
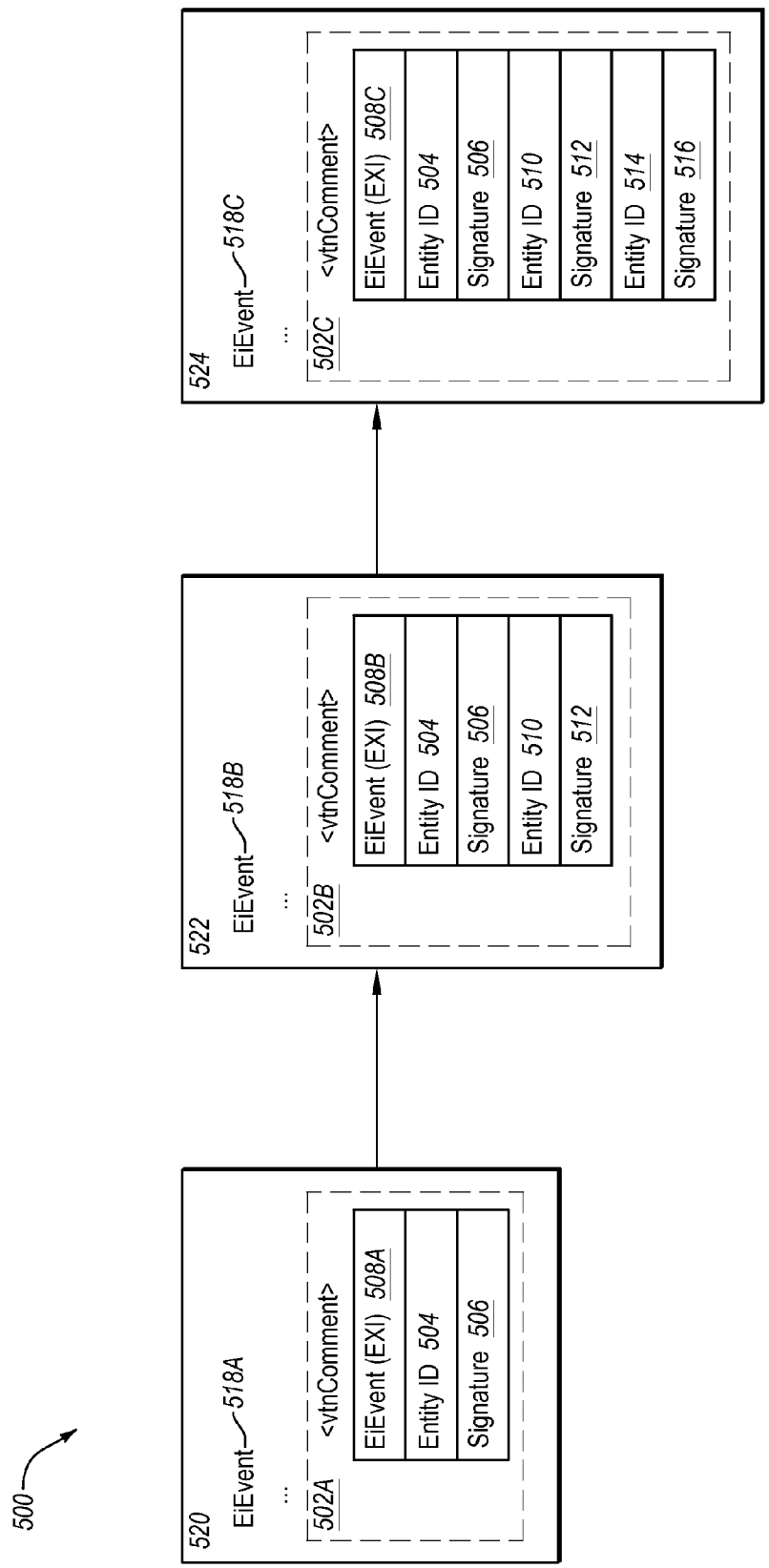
FIG. 5 illustrates an example multi-hop communication that may occur in the environment of FIG. 1.

FIG. 5 illustrates an example multi-hop communication 500 that may occur in the environment 100 of FIG. 1, in accordance with at least one embodiment described herein. Specifically, the multi-hop communication 500 in FIG. 5 is an implementation in which the multi-hop communication 500 is carried out in an open automated demand response (OpenADR) standard protocol. The multi-hop communication 500 may include an originating entity 520, which may communicate data to a first downstream entity 522, which may then communicate data to a second downstream entity 524.

In the multi-hop communication 500, the data communicated may include a demand response (DR) event and/or information pertaining to a DR event. The DR event may include information pertaining to a period of time during which one or more customers may be incentivized to curtail energy usage, for instance. The data may be included in an EiEvent 518A. The EiEvent 518A may not initially include path-metadata, and accordingly may initially include an empty virtual top nodes comment (vtnComment) 502A. The vtnComment is an XML element defined in the OpenADR 2.0 standard protocol. The EiEvent 518A may be formatted according to extensible markup language (XML).

The EiEvent 518A may then be encoded into efficient XML interchange (EXI) and Base64 to generate an EiEvent (EXI) 508A. The EiEvent (EXI) 508A may simply be a compressed form of the EiEvent 518A, accordingly the original XML of the EiEvent 518A may be recovered from the EiEvent (EXI) 508A. As illustrated in FIG. 5, the EiEvent (EXI) 508A may then be stored in vtnComment 502A along with an entity identifier 504 ("Entity ID" in FIG. 5) of the first downstream entity 522 and a digital signature 506 ("signature" in FIG. 5) of the originating entity 520. With combined reference to FIG. 5 and the first path-metadata expression described with reference to FIG. 2, the signature 506 may correspond to $P_1$ and may ensure authenticity of the entity identifier 504 and data-specific metadata that may be calculated based on the EiEvent (EXI) 508A.

Referring back to FIG. 5, in some embodiments, the data included in the EiEvent (EXI) 508A may be structured according to a Merkle hash tree or another redactable signature scheme, and the data-specific metadata to be signed may be the root hash value of the Merkle hash tree. The signature of the originating entity 506 on the pair of the entity identifier 504 and data-specific metadata calculated based on the EiEvent (EXI) 508A may be used to authenticate the data included in the EiEvent (EXI) 508A and that the data included in the EiEvent (EXI) 508A originated at the originating entity 520.

The EiEvent (EXI) 508A, the entity identifier 504, and the digital signature 506 may be communicated to the first downstream entity 522. The first downstream entity 522 may be substantially similar to an intermediate entity 102 described with reference to FIGS. 1 and 2. The first downstream entity 522 may issue another EiEvent 518B that may be formatted according to XML, and in some situations, the EiEvent 518B may be semantically consistent with the EiEvent 518A. The EiEvent (EXI) 508B may convey the content of the EiEvent 518A issued by the originating entity 520 to the downstream entities (e.g., the second downstream entity 524). The EiEvent (EXI) 508B may be identical to the EiEvent (EXI) 508A. Alternatively, some portion of the EiEvent (EXI) 508A may be redacted by the first downstream entity 522 for privacy preservation.

The EiEvent (EXI) 508B may be included in the vtnComment 502B on the first downstream entity 522. The entity identifier 504 and the digital signature 506 may be copied into the vtnComment 502B and a second entity identifier 510 of a second downstream entity 524 and a second digital signature 512 of the first downstream entity 522 may also be included in the vtnComment 502B. With combined reference to FIGS. 2 and 5, the second digital signature 512 may correspond to $P_2$ (discussed above).

Additionally, a Merkle hash tree of the EiEvent 518A may be calculated by the first downstream entity 522 from the EiEvent (EXI) 508A or the EiEvent (EXI) 508B in the vtnComment 502B such that a redacted version of the EiEvent 508A may be authenticated. Unless one of the intermediate entities 522 and/or 524 wants to verify the upstream path metadata, the intermediate entities 522 and/or 524 may not calculate the Merkle hash tree, because redaction may not change the Merkle root hash value of the EiEvent (EXI) 508A. The EiEvent 518B, created by the first downstream entity 522, the EiEvent (EXI) 508B that conveys original data issued by the original entity 520, the digital signatures 506 and 512, and the entity identifiers 504 and 510 may be communicated to the second downstream entity 524.

The second downstream entity 524 may issue another EiEvent 518C which may be formatted in XML. In some situations, the EiEvent 518C may be semantically consistent with the EiEvent 518A. In some embodiments, the EiEvent 518C may include a DR signal that the second downstream entity 524 issues, based on the contents of the EiEvent 518B. Thereby, in these and other situations, the contents of the EiEvent 518B may be semantically consistent with the EiEvents 518A and/or 518B. The EiEvent (EXI) 508C may convey the contents of the EiEvent 518A issued by the originating entity 520 to downstream entities (not shown). The EiEvent (EXI) 508C may be identical to the EiEvents (EXI) 508A and/or 508B. Alternatively, some portion of the EiEvents (EXI) 508A and/or 508B may be redacted by the second downstream entity 524 for privacy preservation. That is, the EiEvent (EXI) 508C may be an unredacted or a redacted version of the EiEvent (EXI) 508A or the EiEvent (EXI) 508B and may carry information of an unredacted or a redacted version of the EiEvent 518A. The digital signatures 506 and 512, and the entity identifiers 504 and 510 may be copied to vtnComment 502C in the second downstream entity 524. Additionally, a third entity identifier 514 of a third downstream entity (not shown) and a digital signature 516 of the second downstream entity 524 may be added to the vtnComment 502C.

In the multi-hop communication 500, the entities 520, 522, and 524 may have the option to ignore one or more of the EiEvent (EXI)'s 508A-508C and/or data included therein. The digital signatures 506, 512, and 516 and the entity identifiers 504, 510, and 514 may be used to verify the data path of the multi-hop communication 500. Additionally, as discussed above, calculation of the Merkle root hash may be used to authenticate the data included in the EiEvent (EXI)'s 508B-508C even if one or more data items of the EiEvent (EXI) 508A have been redacted. In some embodiments, any of the recipients of EiEvent 518C may check the semantic consistency between the EiEvent 518C and the redacted or unredacted version of the EiEvent 518A, which is originally issued by the originating entity 520 and may be recovered from EiEvent (EXI) 508C. By checking the consistency between the EiEvent 518C and the EiEvent 518A the validity of the EiEvent 518A may be judged.

Figure 6:
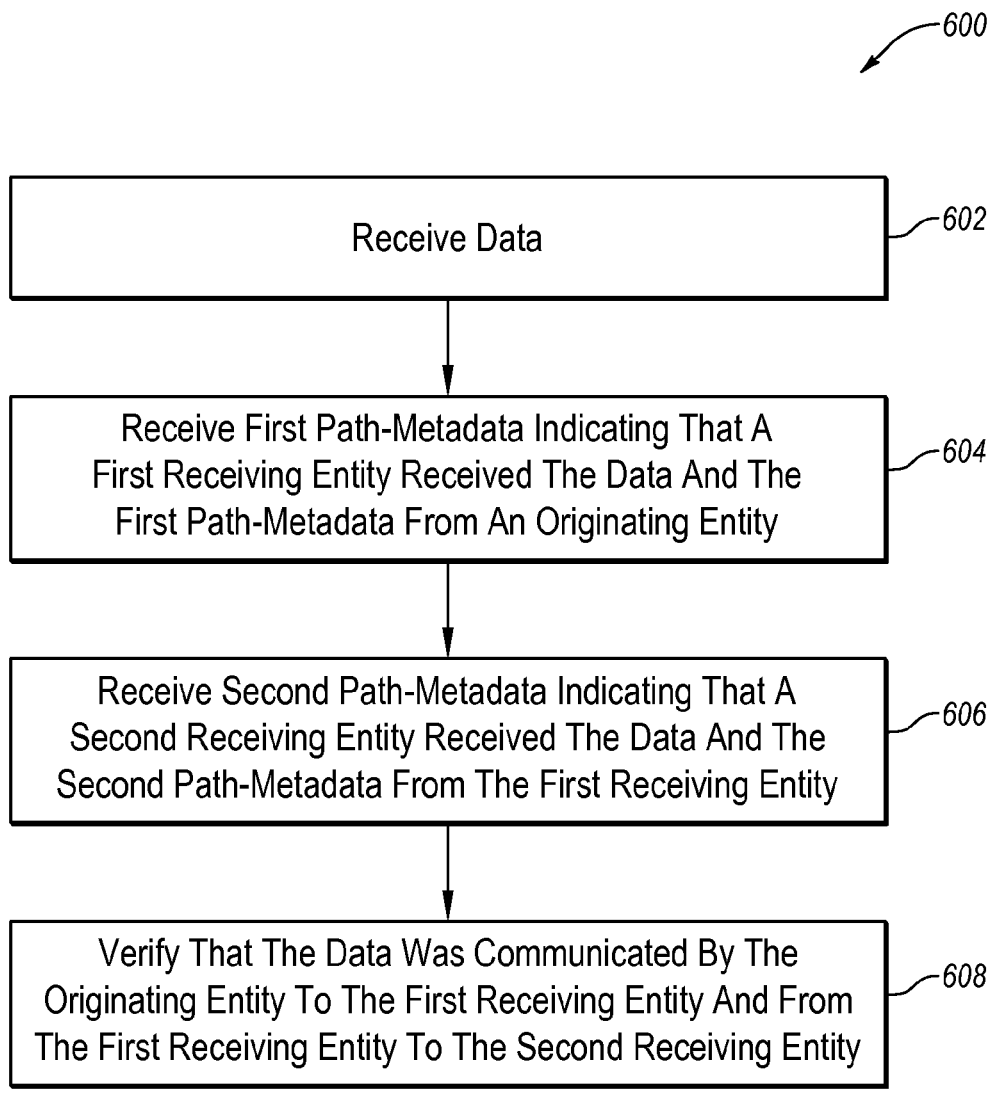
FIG. 6 is a flow chart of an example method of verifying a data path.

FIG. 6 is a flow chart of an example method 600 of verifying a data path in accordance with at least one embodiment described herein. The method 600 may be implemented, in some embodiments, by one or more entities operating in an environment, such as the example entities 102 operating in the example environment 100 of FIG. 1. For example, one or more of the entities 102 of FIG. 1 may be configured to execute computer instructions to perform operations of generating metadata as represented by one or more of blocks 602, 604, and/or 606 of the method 600. Although illustrated as discrete blocks, various blocks may be divided into additional blocks, combined into fewer blocks, or eliminated, depending on the desired implementation. The method 600 will now be discussed with reference to FIG. 6.

The method 600 may begin at 602, in which data is received. The data may include a DR event, which may be included in an EiEvent of the OpenADR standard protocol in some embodiments. The data may include redacted data items, which may have been redacted by obscuring leaf nodes in a Merkle hash tree. Alternatively, the data may be original data in which no data items have been redacted. From the data, data-specific metadata, which may be uniquely tied to the data in some embodiments and may be calculated as described above.

At 604, first path-metadata may be received. The first path-metadata may include a first entity identifier associated with a first receiving entity that receives the first path-metadata from an originating entity. The first path-metadata may also have a first digital signature that may be associated with the originating entity.

In some embodiments, the first entity identifier may be associated with a public key of the first receiving entity and the second entity identifier may be associated with a public key of the second receiving entity. Additionally, in some embodiments, the first digital signature may be based on a private key of the originating entity and the second digital signature may be based on a private key of the first receiving entity.

At 606, second path-metadata may be received. The second path-metadata may include the first path-metadata and a second entity identifier associated with a second receiving entity that receives the second path-metadata from the first receiving entity. The second path-metadata may also have a second digital signature that may be associated with the first receiving entity.

At 608, it may be verified that the data was communicated by the originating entity to the first receiving entity and from the first receiving entity to the second receiving entity based on the first path-metadata, the second path-metadata, the first digital signature and the second digital signature. In some embodiments, the verification may also be based on digital certificates associated with the originating entity and the first receiving entity.

Therefore, the method 600 may be used to verify a data path. One skilled in the art will appreciate that, for this and other procedures and methods disclosed herein, the functions performed in the processes and methods may be implemented in differing order. For example, in some embodiments, the data, first path-metadata and the second path-metadata may be included in a data packet that may be received at the same time, such that blocks 602, 604, and 606 may occur at substantially the same time. Furthermore, the outlined steps and operations are only provided as examples, and some of the steps and operations may be optional, combined into fewer steps and operations, or expanded into additional steps and operations without detracting from the disclosed embodiments.

For instance, the method 600 may include determining whether one or more of the first receiving entity and the second receiving entity are intended recipients of the data based on one or more of the first path-metadata, the second path-metadata, the first digital signature, and the second digital signature. The method 600 may also include rejecting the data when it is determined that one or more of the first receiving entity and the second receiving entity are not intended recipients of the data.

Additionally or alternatively, the method 600 may include determining whether the originating entity and/or the first receiving entity are trusted. When the originating entity and/or the first receiving entity are not trusted, the data may be rejected.

Figure 7:
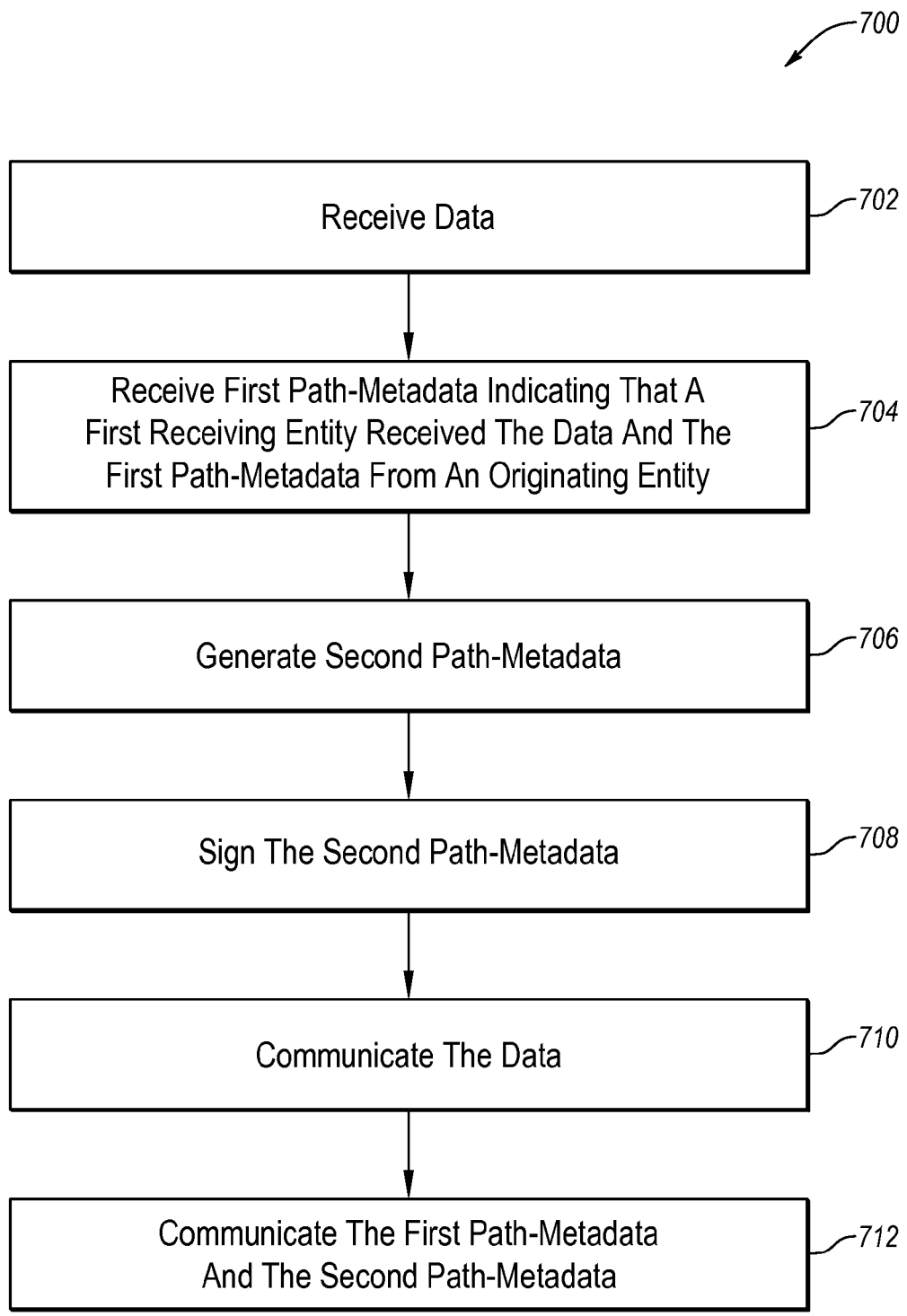
FIG. 7 is another flow chart of an example method of verifying a data path.

FIG. 7 is also a flow chart of an example method 700 of verifying a data path in accordance with at least one embodiment described herein. The method 700 may be implemented, in some embodiments, by one or more entities operating in an environment, such as the example entities 102 operating in the example environment 100 of FIG. 1. For example, one or more of the entities 102 of FIG. 1 may be configured to execute computer instructions to perform operations of generating metadata as represented by one or more blocks of the method 700. Although illustrated as discrete blocks, various blocks may be divided into additional blocks, combined into fewer blocks, or eliminated, depending on the desired implementation.

The method 700 may begin at 702, in which data is received. The data may include a DR event, which may be included in an EiEvent formatted according to XML schema defined in the OpenADR standard protocol and then encoded by using EXI and Base64 in some embodiments. The data may include redacted data items, which may have been redacted by obscuring leaf nodes in a Merkle hash tree. Alternatively, the data may be original data in which no data items have been redacted. From the data, a data-specific metadata, which may be uniquely tied to the data in some embodiments, may be calculated.

At 704, first path-metadata may be received. The first path-metadata may include the data-specific metadata and a first entity identifier associated with a first receiving entity that receives the first path-metadata from an originating entity. The first path-metadata may also have a first digital signature that may be associated with the originating entity.

In some embodiments, the first entity identifier may be associated with a public key of the first receiving entity and the second entity identifier may be associated with a public key of the second receiving entity. Additionally, in some embodiments, the first digital signature may be based on a private key of the originating entity and the second digital signature may be based on a private key of the first receiving entity.

At 706, second path-metadata may be generated. The second path-metadata may include the first path-metadata and a second entity identifier associated with a second receiving entity that may receive the second path-metadata from the first receiving entity. At 708, the second path-metadata may be signed by the first receiving entity to generate a second digital signature.

At 710, the data may be communicated to the second receiving entity. At 712, the first path-metadata and the second path-metadata may also be communicated to the second receiving entity. The first path-metadata and the second path-metadata may be signed with the first digital signature and the second digital signature, respectively such that it may be verified that the data was communicated by the originating entity to the first receiving entity and from the first receiving entity to the second receiving entity based on the first path-metadata, the second path-metadata, the first digital signature and the second digital signature. In some embodiments, the verification may also be based on digital certificates associated with the originating entity and the first receiving entity.

Therefore, the method 700 may also be used to verify a data path. One skilled in the art will appreciate that, for this and other procedures and methods disclosed herein, one or more functions performed in the processes and methods may be implemented in differing order or at the same time. Furthermore, the outlined steps and operations are only provided as examples, and some of the steps and operations may be optional, combined into fewer steps and operations, or expanded into additional steps and operations without detracting from the disclosed embodiments.

Embodiments described herein may include a tangible and/or non-transitory computer-readable medium having encoded therein programming code executable by a processing device to perform the method 600 of FIG. 6, the method 700 of FIG. 7, and/or variations thereof. The processing device may be included in the environment 100 or entities 102 of FIG. 1, for example.

As mentioned above, the embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise non-transitory computer-readable storage media including RAM, ROM, EEPROM, CD-ROM or other optical disk storage, magnetic disk storage or other magnetic storage devices, or any other non-transitory storage medium which may be used to carry or store desired program code means in the form of computer-executable instructions or data structures and which may be accessed by a general purpose or special purpose computer. Combinations of the above should also be included within the scope of computer-readable media.

Computer-executable instructions may include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of verifying a data path, the method comprising:
receiving, by one or more processors, data and a second path-metadata including a first path-metadata,
the first path-metadata being generated by an originating entity and including a first digital signature associated with the originating entity made on a pair including:
a first entity identifier that is associated with a first receiving entity that receives the data and the first path-metadata from the originating entity, and
data-specific metadata uniquely associated with the data, and
the second path-metadata including a second digital signature associated with the first receiving entity made on the pair including:
the first path-metadata, and
a second entity identifier that is associated with a second receiving entity that receives the data and the second path-metadata from the first receiving entity; and
verifying, by the one or more processors, that the data was communicated by the originating entity to the first receiving entity and from the first receiving entity to the second receiving entity based on the first entity identifier of the first path-metadata, the second entity identifier of the second path-metadata, the first digital signature of the first path-metadata, and the second digital signature of the second path-metadata.

2. The method of claim 1, wherein:
the first entity identifier is associated with a public key of the first receiving entity; and
the second entity identifier is associated with a public key of the second receiving entity.

3. The method of claim 1, wherein the verifying is further based on a first digital certificate associated with the originating entity and a second digital certificate associated with the first receiving entity.

4. The method of claim 1, wherein:
the first digital signature is based on a private key associated with the originating entity; and
the second digital signature is based on a private key associated with the first receiving entity.

5. The method of claim 1, wherein the data is structured according to a redactable signature scheme.

6. The method of claim 1, wherein the data is associated with a demand response related to energy consumption.

7. The method of claim 1, further comprising:
determining whether one or more of the first receiving entity and the second receiving entity are intended recipients of the data based on one or more of the first path-metadata, the second path-metadata, the first digital signature, and the second digital signature; and
rejecting the data when it is determined that one or more of the first receiving entity and the second receiving entity are not intended recipients of the data.

8. The method of claim 1, wherein the verifying includes calculating data-specific metadata from the received data.

9. A method of path verification, the method comprising:
receiving, by a first receiving entity from an originating entity, data and first path-metadata, the first path-metadata being generated by the originating entity and including a first digital signature associated with the originating entity made on a pair including
the first entity identifier that is associated with the first receiving entity, and
data-specific metadata uniquely associated with the data;
signing by the first receiving entity, with a second digital signature associated with the first receiving entity, a pair including:
the first path-metadata, and
a second entity identifier that is associated with a second receiving entity; and
communicating, by the first receiving entity to the second receiving entity, the data and the pair including the first path-metadata and the second entity identifier that is signed by the second digital signature.

10. The method of claim 9, wherein:
the first entity identifier is associated with a public key of the first receiving entity;
the second entity identifier is associated with a public key of the second receiving entity;
the first digital signature is based on a private key associated with the originating entity; and
the second digital signature is based on a private key associated with the first receiving entity.

11. The method of claim 9, wherein the communicating allows for verification by the second receiving entity that the data was communicated by the originating entity to the first receiving entity and communicated from the first receiving entity to the second receiving entity based on the first path-metadata, the second path-metadata, the first digital signature, and the second digital signature.

12. The method of claim 9, wherein the data is structured according to a redactable signature scheme.

13. The method of claim 9, wherein the data is associated with a demand response related to energy consumption.

14. A processor configured to execute computer instructions to cause a computing system to perform operations for verifying a data path, the operations comprising:
receiving data and a second path-metadata including a first path-metadata,
the first path-metadata being generated by an originating entity and including a first digital signature associated with the originating entity made on a pair including:
a first entity identifier that is associated with a first receiving entity that receives the data and the first path-metadata from the originating entity, and
data-specific metadata uniquely associated with the data, and
the second path-metadata including a second digital signature associated with the first receiving entity made on the pair including:

the first path-metadata, and a second entity identifier that is associated with a second receiving entity that receives the data and the second path-metadata from the first receiving entity; and verifying that the data was communicated by the originating entity to the first receiving entity and from the first receiving entity to the second receiving entity based on the first entity identifier of the first path-metadata, the second entity identifier of the second path-metadata, the first digital signature of the first path-metadata, and the second digital signature of the second path-metadata.

15. The processor of claim 14, wherein the verifying is further based on a first digital certificate associated with the originating entity and a second digital certificate associated with the first receiving entity.

16. The processor of claim 14, wherein the data is structured according to a redactable signature scheme.

17. The processor of claim 14, wherein the operations further comprise:

determining whether one or more of the first receiving entity and the second receiving entity are intended recipients of the data based on one or more of the first path-metadata, the second path-metadata, the first digital signature, and the second digital signature; and rejecting the data when it is determined that one or more of the first receiving entity and the second receiving entity are not intended recipients of the data.

18. The processor of claim 14, wherein the verifying includes calculating data-specific metadata from the received data.

19. The processor of claim 14, wherein:

the first entity identifier is associated with a public key of the first receiving entity; and the second entity identifier is associated with a public key of the second receiving entity.

20. The processor of claim 14, wherein:

the first digital signature is based on a private key associated with the originating entity; and the second digital signature is based on a private key associated with the first receiving entity.

* * * * *